US010908804B2

(12) United States Patent
Rocha et al.

(10) Patent No.: US 10,908,804 B2
(45) Date of Patent: Feb. 2, 2021

(54) INCREMENTAL MOUNT FRAMEWORK

(71) Applicant: Facebook, Inc., Menlo Park, CA (US)

(72) Inventors: Lucas Almeida Rocha, Bromley (GB); Marco Cova, London (GB)

(73) Assignee: Facebook, Inc., Menlo Park, CA (US)

(*) Notice: Subject to any disclaimer, the term of this patent is extended or adjusted under 35 U.S.C. 154(b) by 61 days.

(21) Appl. No.: 15/691,689

(22) Filed: Aug. 30, 2017

(65) Prior Publication Data

US 2019/0065022 A1 Feb. 28, 2019

(51) Int. Cl.
*G06F 3/0485* (2013.01)
*G06F 3/0481* (2013.01)
*G06F 9/451* (2018.01)
*G06F 12/0893* (2016.01)

(52) U.S. Cl.
CPC .......... *G06F 3/0485* (2013.01); *G06F 3/0481* (2013.01); *G06F 9/451* (2018.02); *G06F 12/0893* (2013.01)

(58) Field of Classification Search
CPC ...... G06F 3/0485; G06F 9/451; G06F 3/0481; G06F 12/0893
See application file for complete search history.

(56) References Cited

U.S. PATENT DOCUMENTS

| | | | | |
|---|---|---|---|---|
| 9,519,590 B1 * | 12/2016 | Armangau | .......... | G06F 12/0871 |
| 10,354,363 B2 * | 7/2019 | Kaldor | ...................... | G06F 3/14 |
| 2002/0129096 A1 * | 9/2002 | Mansour | ................. | G06F 9/451 |
| | | | | 709/203 |
| 2010/0070924 A1 * | 3/2010 | Hart, II | ................... | G06F 9/451 |
| | | | | 715/829 |
| 2012/0284662 A1 * | 11/2012 | Kumar | .................... | G06F 9/451 |
| | | | | 715/781 |
| 2013/0219256 A1 * | 8/2013 | Lloyd | ................... | G06F 17/246 |
| | | | | 715/212 |
| 2014/0250393 A1 * | 9/2014 | Goodson | .............. | G06F 3/0481 |
| | | | | 715/765 |
| 2014/0281901 A1 * | 9/2014 | Mostowy | ........... | G06F 16/9577 |
| | | | | 715/234 |

(Continued)

OTHER PUBLICATIONS

W3C CSS Positioning Sec. 9.3, available at <URL=https://www.w3.org/TR/2011/REC-CSS2-20110607/#minitoc> (Year: 2011).*

(Continued)

*Primary Examiner* — James T Tsai
(74) *Attorney, Agent, or Firm* — FisherBroyles, LLP

(57) ABSTRACT

Systems and methods directed to improve the responsiveness of an application's UI and improve a user's experience are disclosed. In particular, the systems and methods implement layout and rendering of UI components in a mobile application as two independent steps: layout and mount. During the layout step, attributes related to a layout are identified. For example, during the layout step, a list of UI components in each container, and their respective sizes and positions are identified. The layout result is then used in the mount step to create an actual view hierarchy to be rendered on screen once the component becomes visible. As result of this decoupling of layout operations from the rendering operations, the CPU-intensive measure and layout operations can be moved to the background thread, saving milliseconds.

20 Claims, 16 Drawing Sheets

(56) References Cited

U.S. PATENT DOCUMENTS

2015/0007108 A1* 1/2015 Ozcelik ............... G06F 3/0482
715/810

OTHER PUBLICATIONS

Anatriello, P. et al. "Open-sourcing Litho, a declarative UI framework for Android" Apr. 18, 2017 Accessed from <https://code.facebook.com/posts/1187475984695956/open-sourcing-litho-a-declarative-ui-framework-for-android/> 5 pages.
Facebook "Litho: A Declarative Framework for Efficient UIs" Posted on:Apr 18, 8:20pm PDT, accessed from <https://developers.facebook.com/videos/f8-2017/litho-a-declarative-framework-for-efficient-uis/> 4 pages.
Litho "Tutorial" Accessed from <https://fblitho.com/docs/tutorial> 12 pages.
Rocha, L. "Components for Android: A declarative framework for efficient UIs" Oct. 26, 2016. Accessed from <https://code.facebook.com/posts/531104390396423/components-for-android-a-declarative-framework-for-efficient-uis> 10 pages.

* cited by examiner

Mount
820

Layout
815

Artifacts
810

INCREMENTAL MOUNT FRAMEWORK

BACKGROUND

Web pages displayed at a user's device are expected to offer smooth interaction with minimal delay in rendering. That is, web pages should not only load quickly, but also run well. Further, a user should be able to scroll a web page without experiencing jitters to breaks in viewing experience. Most devices today refresh their screens 60 times a second. If the web page being displayed contains an animation or a transition, or the user is scrolling the pages, the browser needs to match the device's refresh rate and put up 1 new picture, or frame, for each of those screen refreshes. Thus, each frame has a budget of about 16 ms (1 second/60=16.67 ms). When a user's device fails to meet this budget, the frame rate drops, and the content judders on screen. This is often referred to as jank, and it negatively impacts the user's experience.

BRIEF DESCRIPTION OF THE DRAWINGS

The techniques introduced here may be better understood by referring to the following Detailed Description in conjunction with the accompanying drawings, in which, like reference numerals, indicate identical or functionally similar elements.

DETAILED DESCRIPTION

Overview

Figure 1:
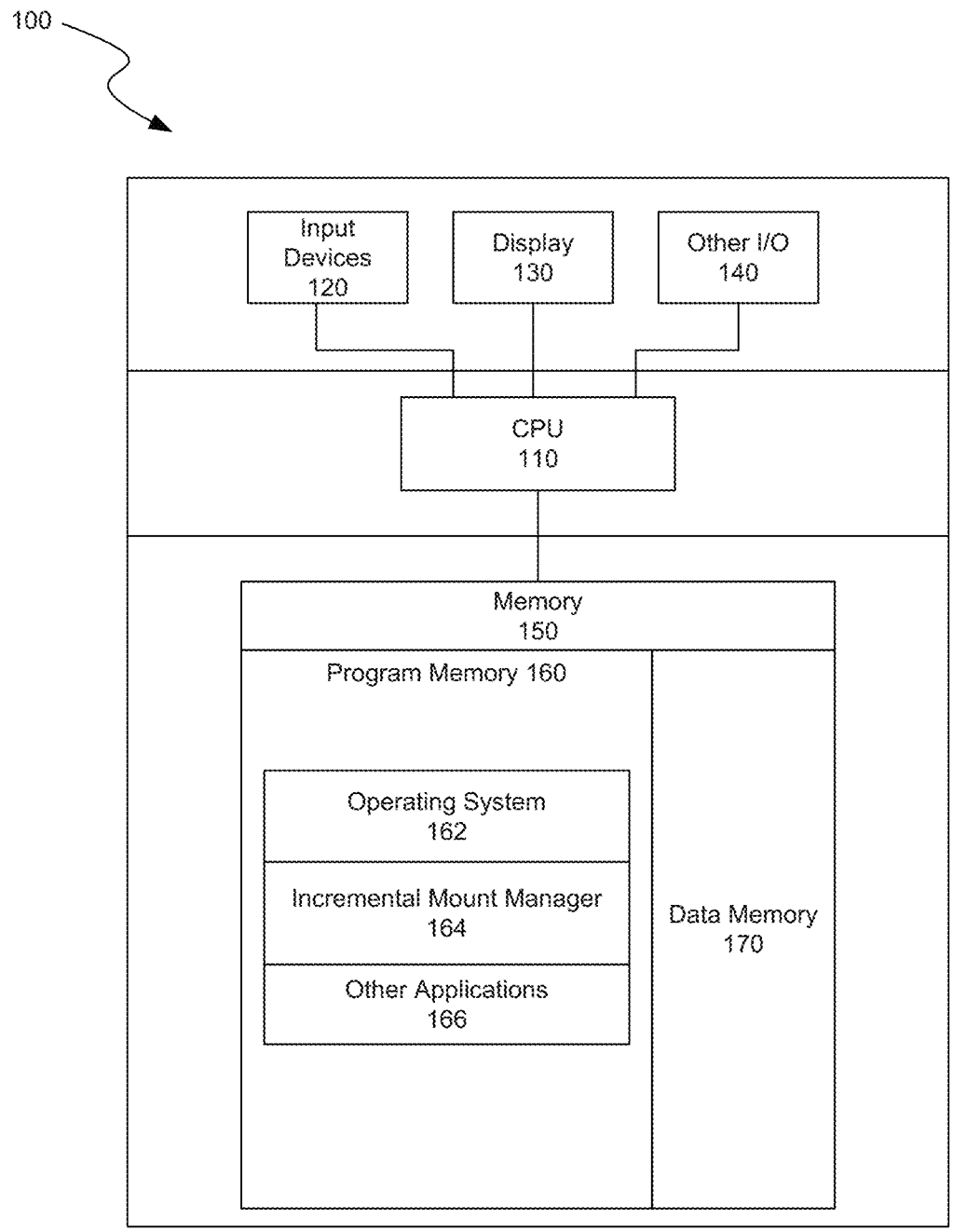
FIG. 1 is a block diagram showing some of the components typically incorporated in computer systems and other devices on which an incremental mount framework can be implemented.

As User Interfaces (UIs) become increasingly sophisticated, it gets harder to complete all the rendering work that needs to get done in the time frame allotted to generating each display frame. This proves to be especially challenging with dynamic scrolling surfaces, as new pieces of the UI are constantly being introduced onscreen. Scrollable user interfaces are the dominant paradigm on mobile applications. Traditional mobile applications use components and widgets provided by standard mobile operating systems. For example, mobile applications designed for the Android platform use components such as RecyclerView, CardView, ListView, etc. to implement various UI components in the application. Typically, a list user interface in Android is built by performing the the following steps: using a layout manager to create a layout for the items in the list user interface, and associating the layout to a RecylerView adapter. The layout manager positions item views inside a RecyclerView and determines when to reuse item views that are no longer visible to the user. To reuse (or recycle) a view, the layout manager may ask the RecyclerView adapter to replace the contents of the view with a different element from the dataset. In this manner, RecyclerView is able to display elements from large data sets by creating only enough views to fill the screen and then recycling and reusing them as the UI scrolls. Whenever a new item is about to become visible, RecyclerView recycles or creates the appropriate view, binds the view with the right data, and then finally measure, lay out, and draw it onscreen. While recycling views in this manner improves performance by avoiding the creation of unnecessary views or performing expensive lookups, this approach is not scalable to large lists that involve infinite scrolling. Fitting all these operations within the 16 ms the main thread has to compute a new frame is challenging.

Existing methods are also unable to handle large lists with complex list items without compromising user experience. For example, for a list with infinite scrolling, the existing methods are unable to efficiently recycle views, while ensuring that no frames are dropped while scrolling complex list items (e.g., lists with an unlimited variety of content including shared links, rich text, videos, ads, photos, etc.). Additionally, while existing methods can handle a small number of view types, they are unable to efficiently handle recycling of several different view types, with virtually infinite content variation, in a manner that does not impact the processing and rendering of the various UI components while minimizing jank. As a result, existing methods are unable to consistently deliver smooth scroll performance with complex content. Further, for large scale applications, code changes are made by engineers who collaborate across multiple product teams and deliver code changes every day—thus, it is not sustainable to rely on individual teams to come up with one-off solutions for their own products.

The present disclosure is directed to improve the responsiveness of an application's UI and improve a user's experience, while overcoming the deficiencies of existing methods and frameworks. In some implementations, layout and rendering of UI components in a mobile application are implemented as two independent steps: layout and mount. During the layout step, attributes related to a layout can be identified. For example, during the layout step, a list of UI components in each container, and their respective sizes and positions, can be identified. The layout result is then used in the mount step to create an actual view hierarchy to be rendered on screen once the component becomes visible. As a result of this decoupling of layout operations from the rendering operations, the CPU-intensive measure and layout operations can be moved to the background thread, saving milliseconds.

The framework described in the present disclosure can also break down complex views into smaller pieces such as text, images, and videos, and render them incrementally, spreading the work that needs to be done across multiple frames. This is especially relevant for complex items that would be very challenging to implement efficiently without a lot of custom optimizations.

The present disclosure further offers a view recycling mechanism where different types of UI components can be recycled from one or more UI component pools. As soon as the inner parts of a composite container move off screen, the framework can make them immediately available for reuse by any other item in the adapter. The recycled components can then be recombined in a virtually infinite number of ways, reducing the total number of views that need to be created and stored in memory. For example, the framework can dynamically cross-pollinate UI components like text and images across all composite containers.

In this way, the framework described in the present disclosure enables the development of complex containers that are able to seamlessly perform layout ahead of time in a background thread and render much flatter view hierarchies that are incrementally mounted using fine-grained recycling, resulting in improved scroll performance. These advantages result in improved scroll performance, better memory behavior with complex views, and easier-to-test UI code.

DESCRIPTION OF FIGURES

The following description provides certain specific details of the illustrated examples. One skilled in the relevant art will understand, however, that embodiments can be practiced without many of these details. Likewise, one skilled in the relevant art will also understand that the present disclosure can include many other obvious features not described in detail herein. Additionally, some well-known structures or functions may not be shown or described in detail below, to avoid unnecessarily obscuring the relevant descriptions of the various examples.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that implements an incremental mount framework. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, incremental mount manager 164, and other application programs 166. Memory 150 can also include data memory 170 that can include user data such as content or artifacts (e.g., images, videos, strings, URLs, etc.), UI components (e.g., text, list item, image, video, etc.), UI component properties (e.g., text size, title, subtitle, color, font, alignment, width, height, pixel dimension, etc.), layout specifications (e.g., a composite view of components in an immutable layout tree), mount specifications (e.g., a component that can render views or drawables), configuration data, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
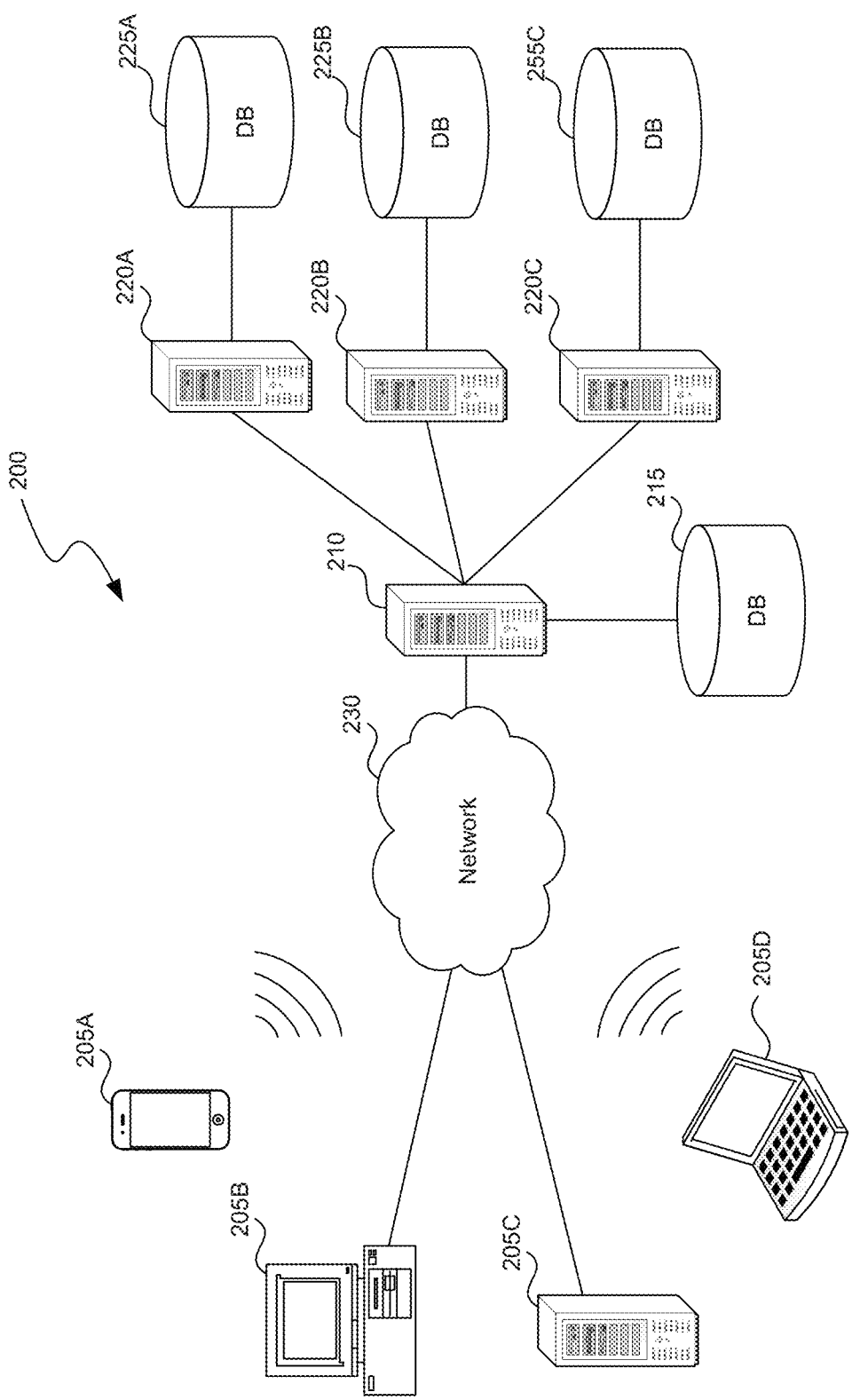
FIG. 2 is a system diagram illustrating an example of a computing environment in which an incremental mount framework can be utilized.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as content or artifacts (e.g., images, videos, strings, URLs, etc.), UI components (e.g., text, list item, image, video, etc.), UI component properties (e.g., text size, title, subtitle, color, font, alignment, width, height, pixel dimension, etc.), layout specifications (e.g., a composite view of components in an immutable layout tree), mount specifications (e.g., a component that can render views or drawables), configuration data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
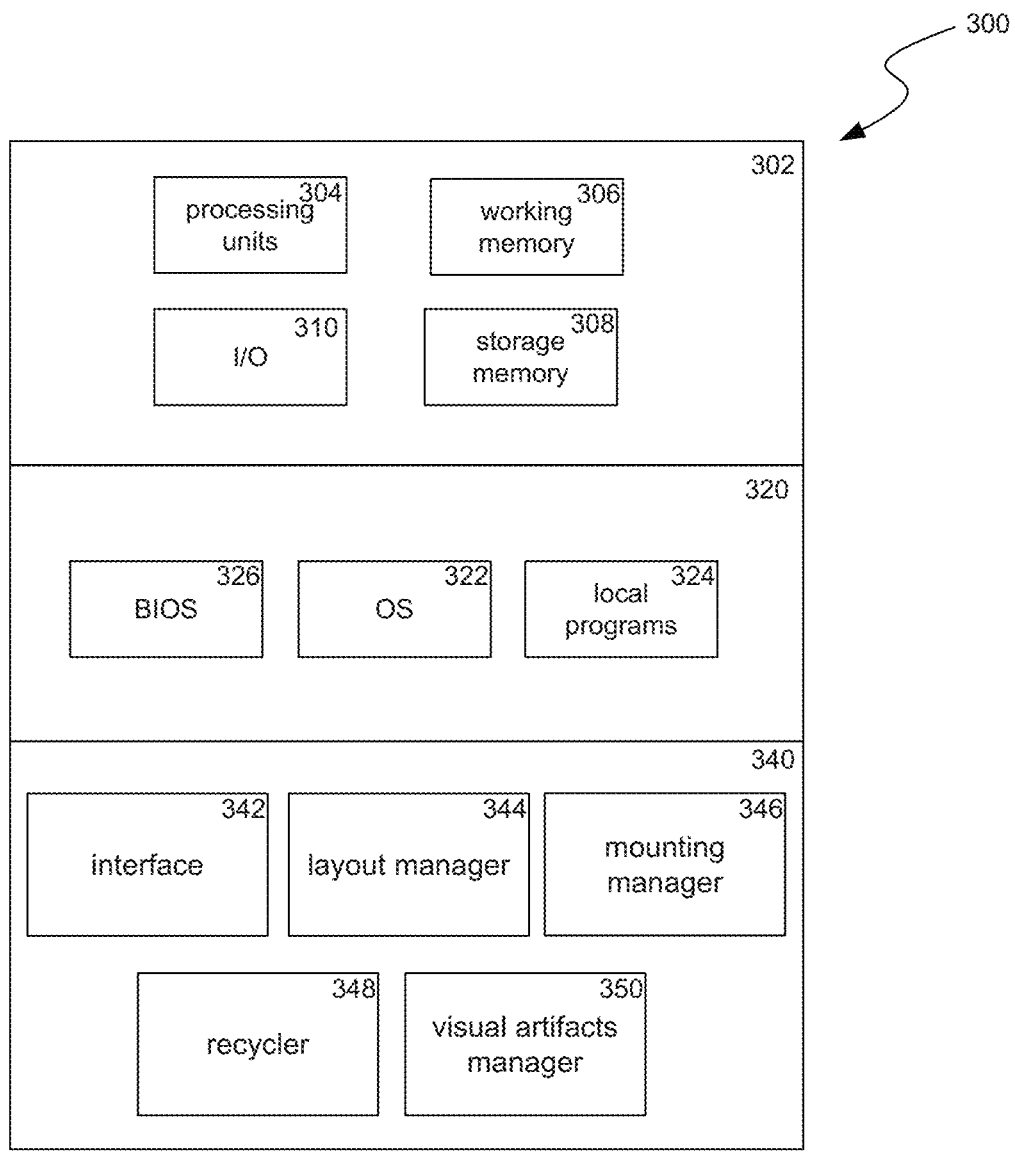
FIG. 3 is a display diagram illustrating incremental mount of components in accordance with some embodiments.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include layout manager 344, mounting manager 346, recycler 348, visual artifacts manager 350, and components which can be used for transferring data and controlling the specialized components, such as interface 342. In some implementations, components 300 can be in a computing system that is distributed across multiple computing devices or can be an interface to a server-based application executing one or more of specialized components 340.

Figure 4A:
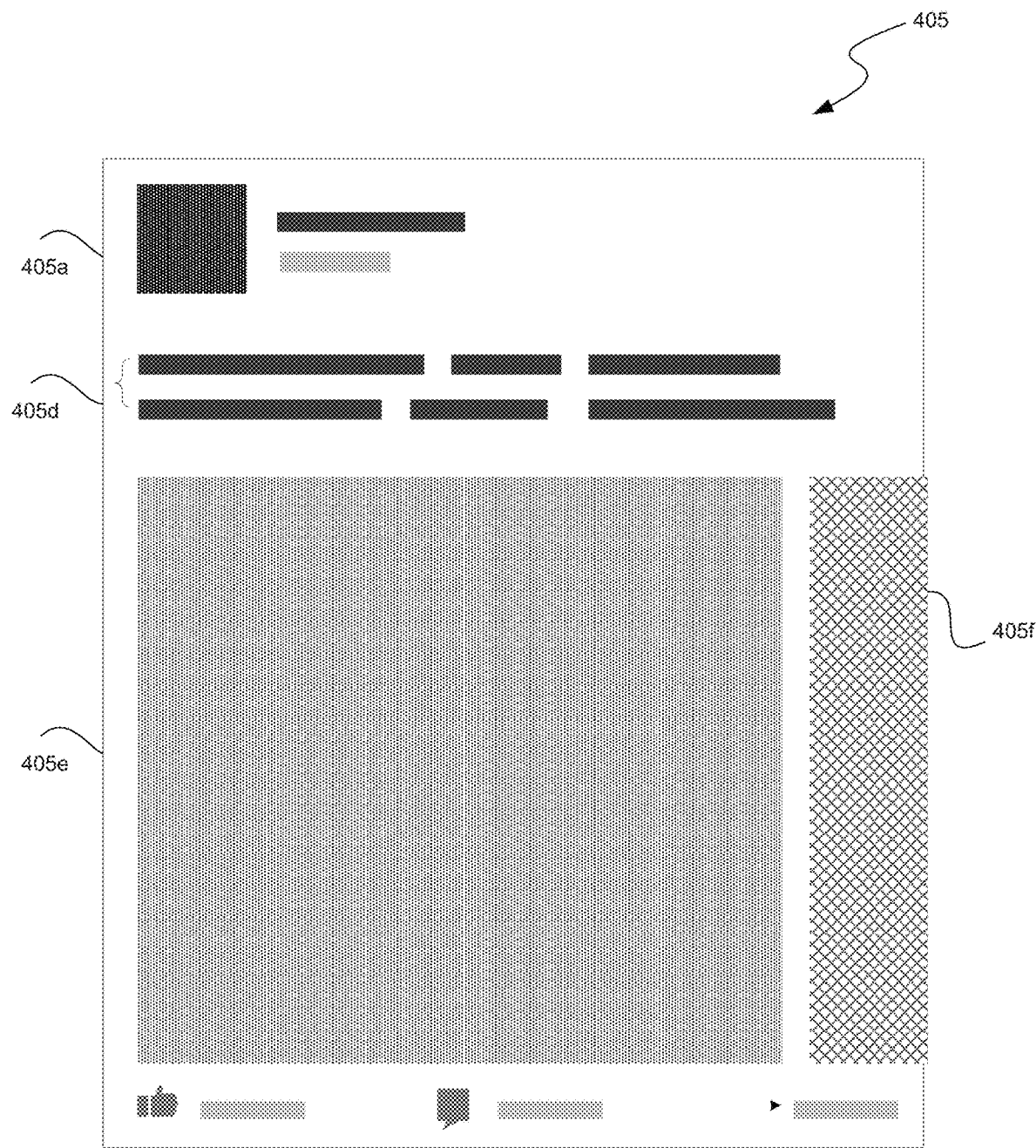
FIGS. 4A-4C are display diagrams illustrating incremental mount of components in accordance with some embodiments.
Figure 4B:
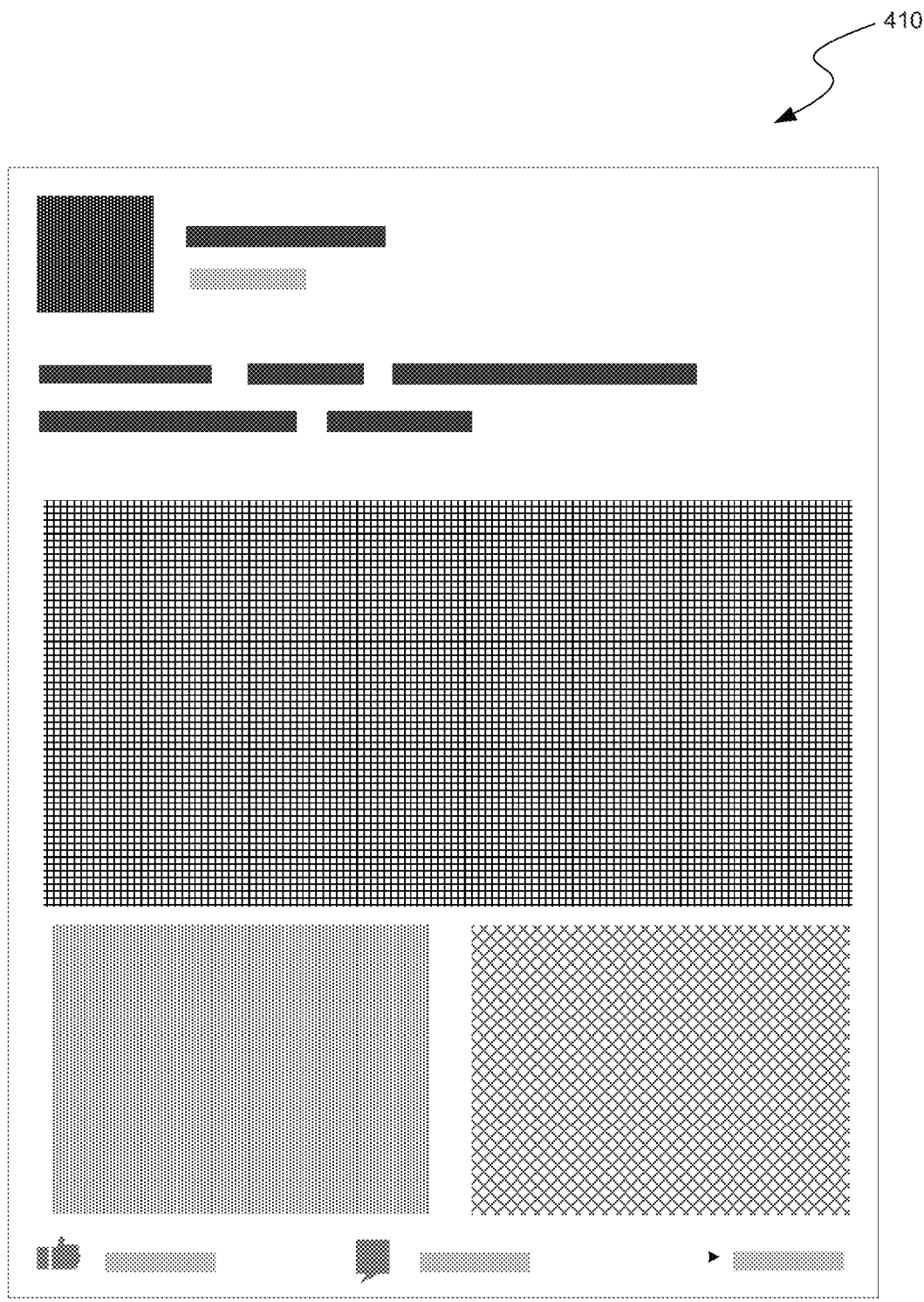
Figure 4C:
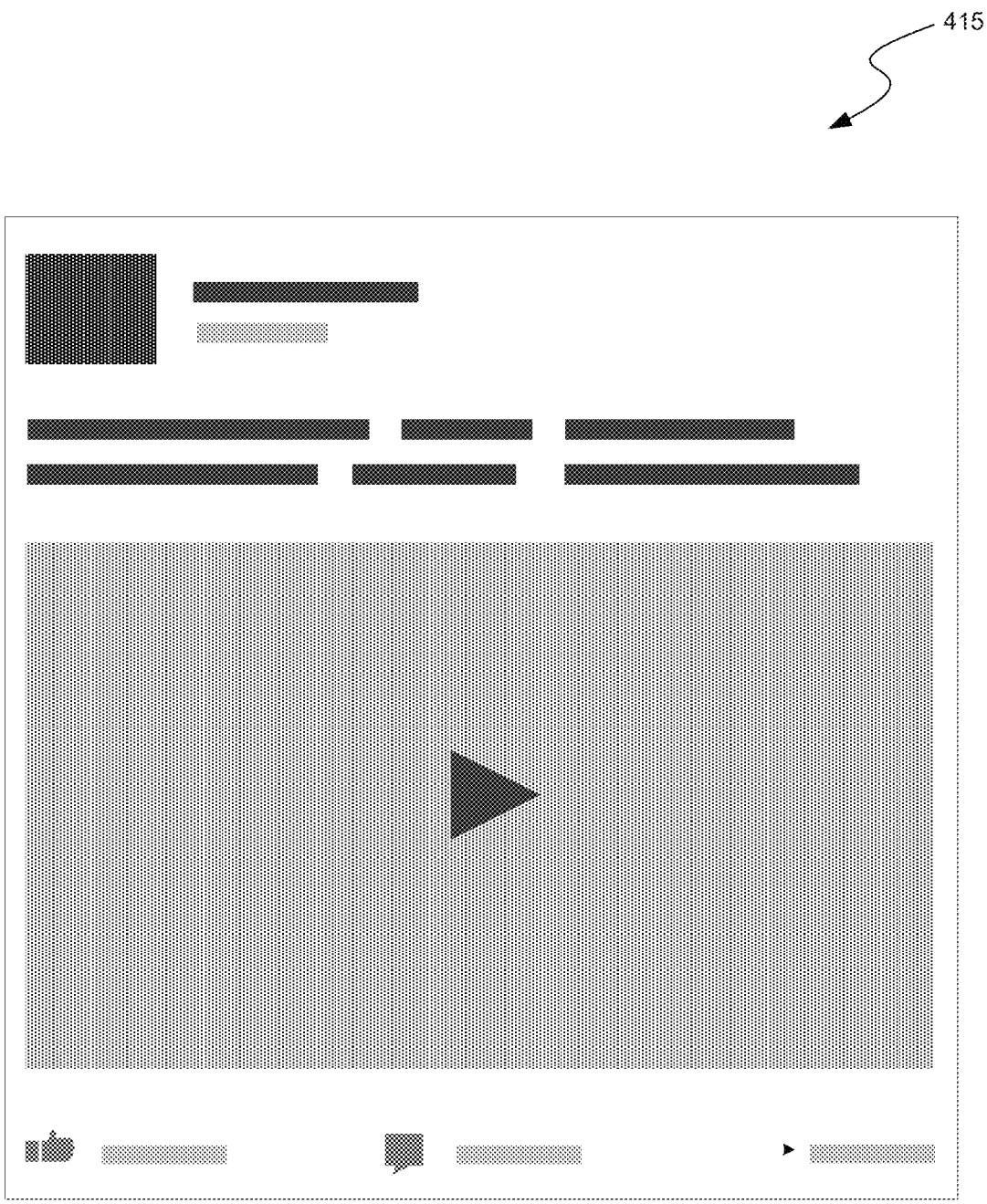
Figure 5:
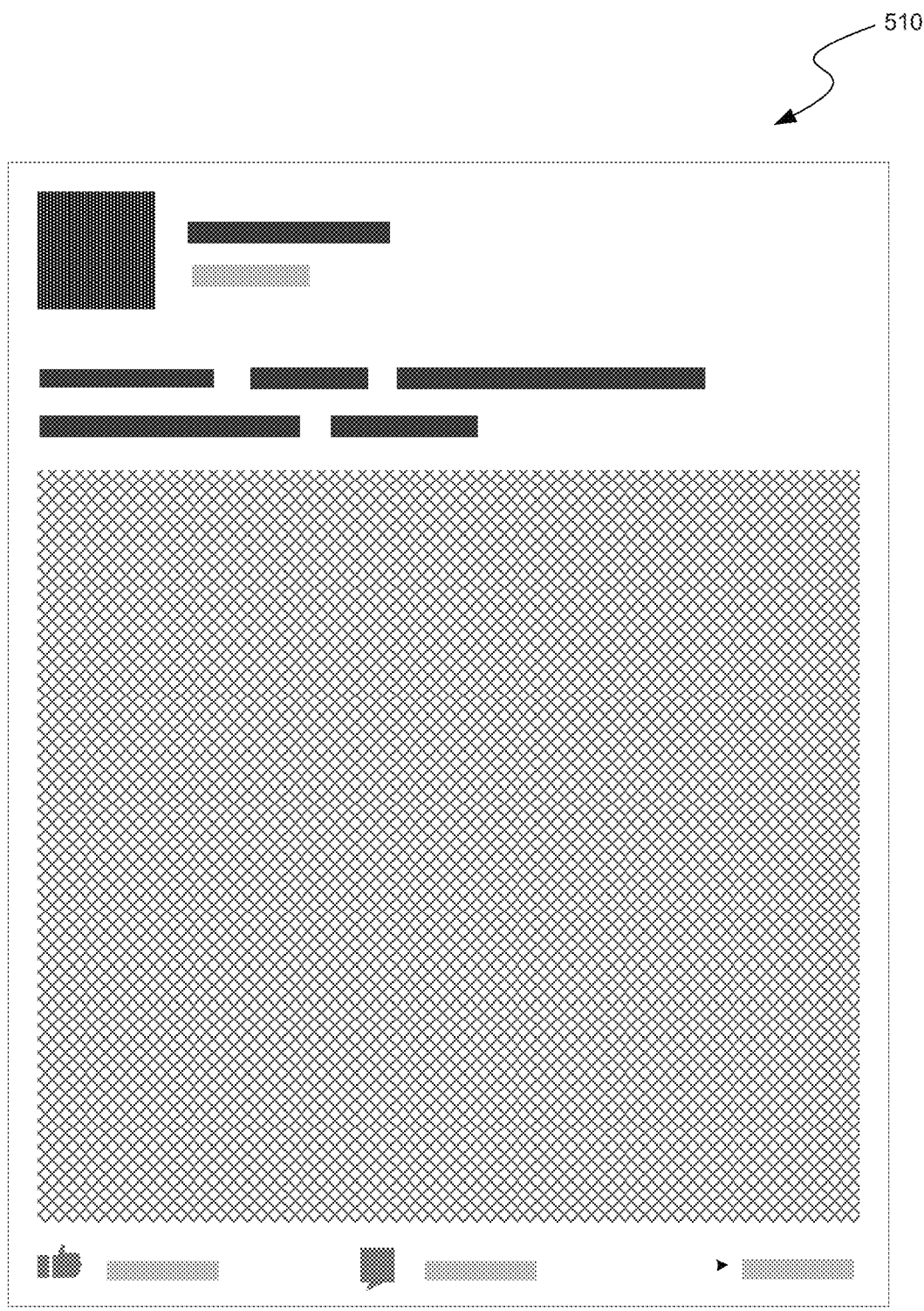
FIG. 5 is a display diagram illustrating incremental mount of components in accordance with some embodiments.

Layout manager 344 manages and maintains one or more layout views for an application. For example, layout manager 344 can group one or more UI components together in a layout tree that corresponds to a layout view or a container. Based on a layout tree, layout manager 344 can determine a list of UI components and their respective sizes and positions. FIGS. 4 and 5 illustrate various examples of layout views or containers, each comprising multiple UI components. Layout manager 344 can create a layout tree for each layout view or container 405, 410, 415, and/or 510 (FIGS. 4A-4C and FIG. 5). Layout manager 344 can create a layout tree by first determining a set of UI components in a layout view or container, and then, for each UI component, computing its bounds and other properties, such as the height, width, position, color, etc.

For example, for container 405 (FIG. 4A), layout manager 344 can create a layout tree which has a root container with two sets of UI components—one in the X direction and a second in the Y direction. The set of UI components in the Y direction comprises an image component 405a, and three text components 405b, 405c, and 405d. The set of UI components in the Y direction comprises a horizontal scroll component with at least two image components 405e and 405f. Layout manager can determine the two different sets of UI components in container 405. Then, for each UI component in each set, layout manager 344 can determine the bounds (e.g., size and layout), as well as other properties (e.g., font of text, color, resolution, etc.). Size of a UI component can be based on a determined dimension of the UI component in one or more directions (e.g., X direction, Y direction, Z direction, etc.), height property, width property, etc. Layout of a UI component can be based on a set of coordinates (e.g., X, Y, and Z) that indicate a position of the UI component relative to a corner of the display screen, a corner of the app bounds, other components in the container, etc. Types of UI components can include, but are not limited to, text, image, video, horizontal scroll component, vertical scroll component, hyperlink, audio, etc.

Figure 6:
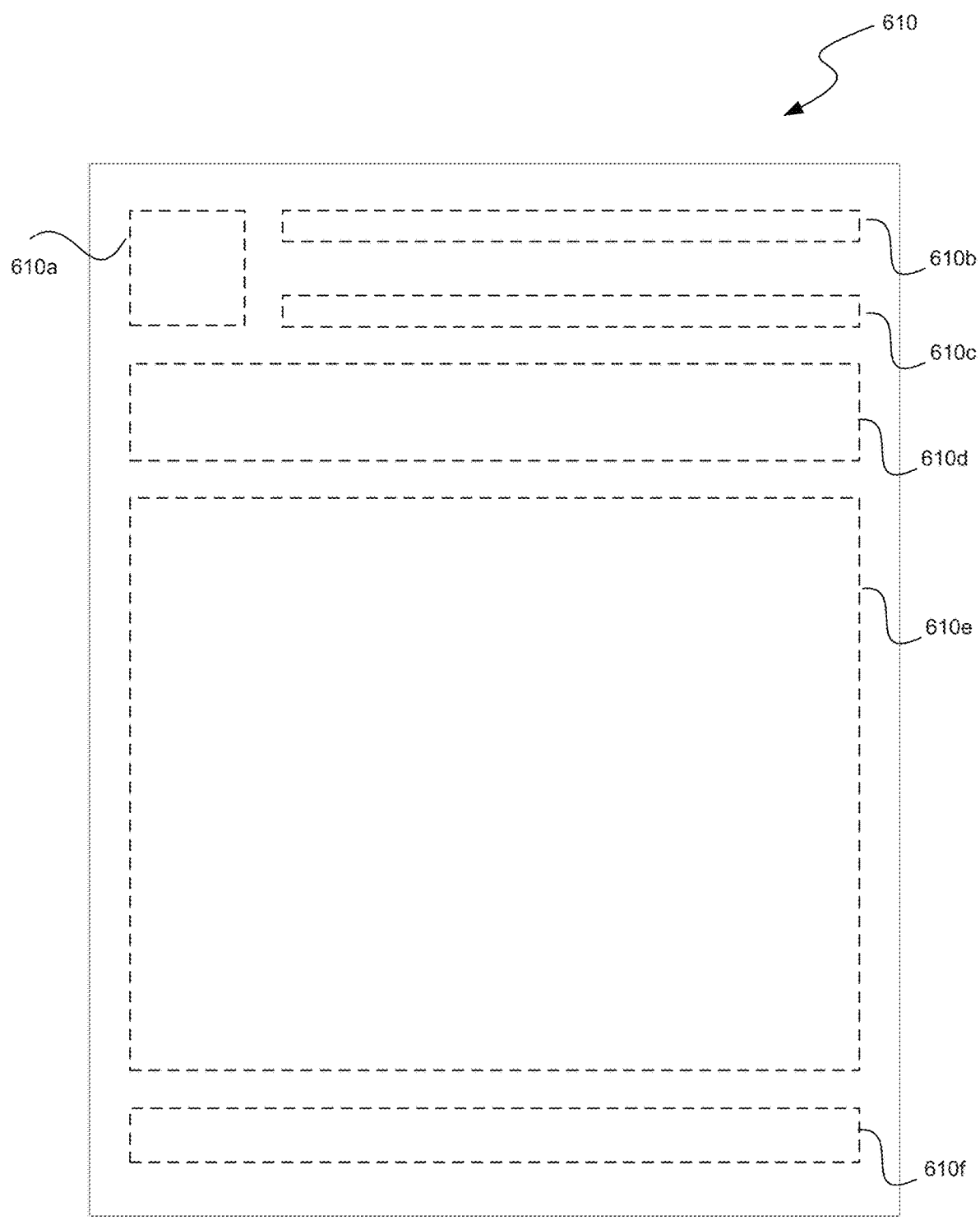
FIG. 6 is a display diagram illustrating incremental mount of components in accordance with some embodiments.

Similarly, for container 415, layout manager 344 can create a layout tree which has a root container with only one set of UI components in the Y direction. FIG. 6 illustrates a layout tree corresponding to container 415 (FIG. 4C) with an image UI component 610a, text UI components 610b, 610c, 610d, and 610f, and a video UI component 610e. As another example, layout manager 344 can create a layout tree for container 510 (FIG. 5) by determining a set of UI components in container 510, and for each UI component, computing its bounds (e.g., size and position) and other properties (e.g., predefined and/or custom properties).

As another example illustrated below, layout manager 344 can create a layout tree which has a root Container with two children stacked horizontally (Row.create) and vertically centered (Align.CENTER). The first child is a SolidColor component that takes a colorRes prop and has a 40 dp width and height. The second child is a Text component that takes a property named text and fills the remaining horizontal space available in the container using the grow(1f) property.

```
@LayoutSpec
public class MyComponentSpec {
    @OnCreateLayout
    static ComponentLayout onCreateLayout(
        ComponentContext c,
        @Prop int color,
        @Prop String title) {
      return Row.create(c)
          .alignItems(CENTER)
          .child(
              SolidColor.create(c)
                  .colorRes(color)
                  .withLayout( )
                  .widthDip(40)
                  .heightDip(40))
          .child(
              Text.create(c)
                  .text(title)
                  .textSizeRes(R.dimen.my_text_size)
                  .withLayout( )
                  .flexGrow(1f))
          .build( );
    }
}
```

Figure 7:
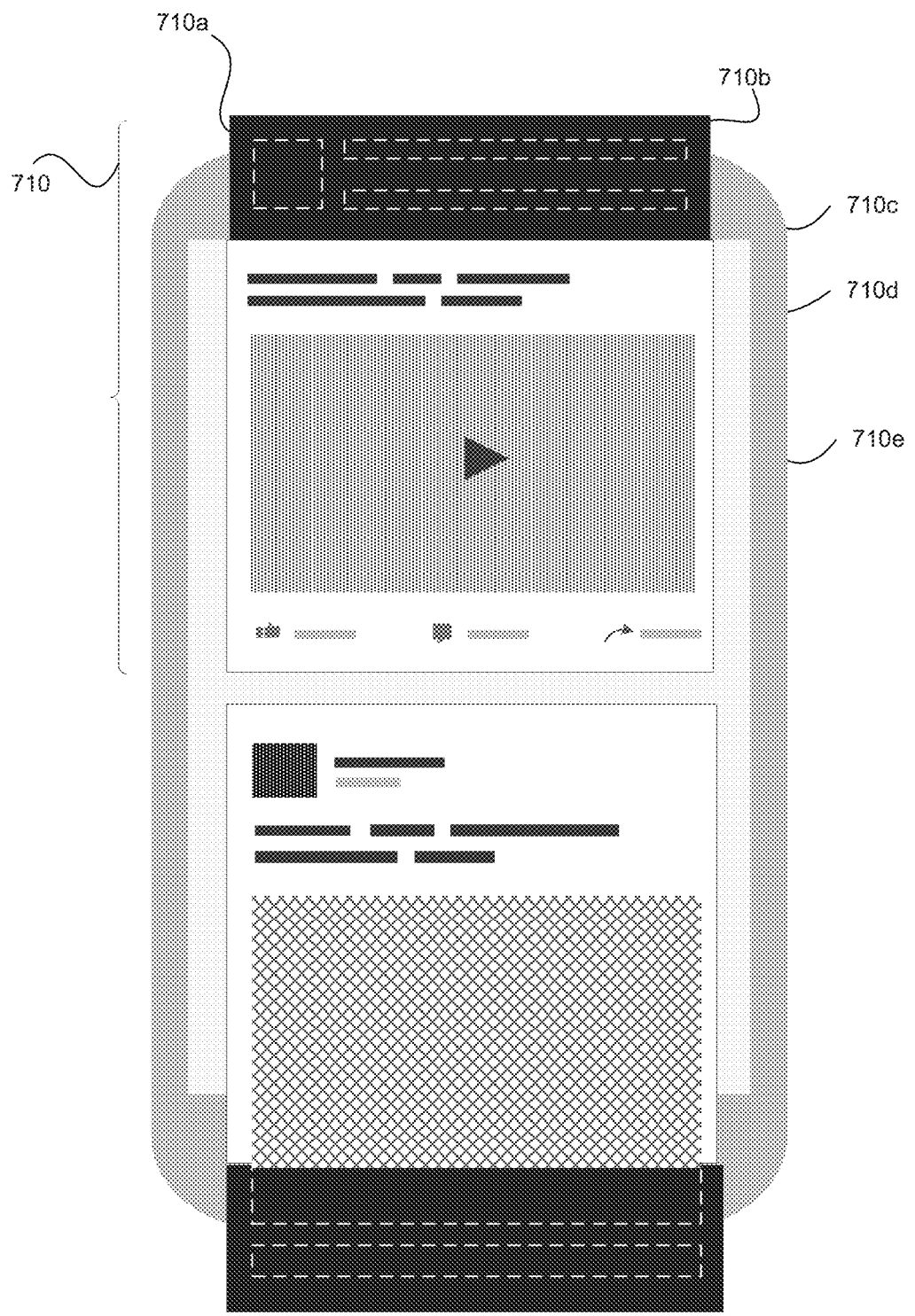
FIG. 7 is a display diagram illustrating incremental mount of components in accordance with some embodiments.
Figure 8:
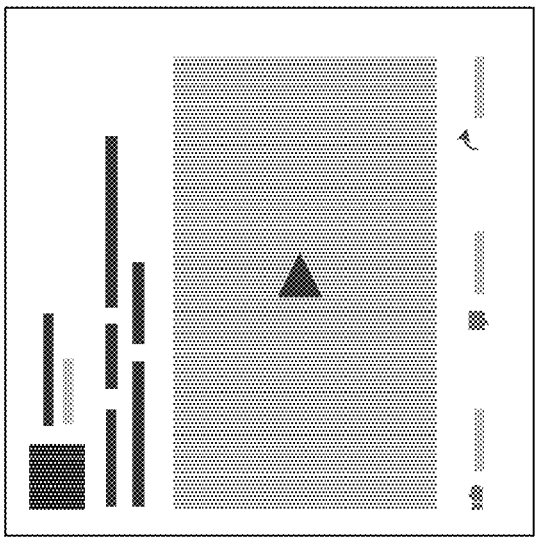
FIG. 8 is a display diagram illustrating incremental mount of components in accordance with some embodiments.
Figure 8:
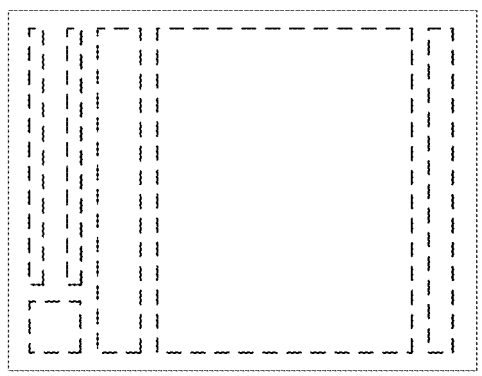
Figure 8:
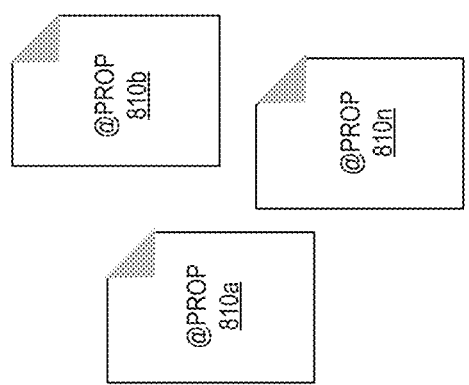

Mounting manager 346 manages the mounting (rendering) of UI components in a container as they become visible on screen. Mounting manager 346 can determine if at least a part of a container is within the bounds of a visible portion of a screen. If at least a part of the container is visible, mounting manager can then determine the specific UI components in the container that are within the visible portion. Based on a scrolling action, only a subset of UI components in a container may actually be visible on the screen. For example, as illustrated in FIG. 7, for container 710 (which corresponds to container 610 illustrated in FIG. 6), mounting manager 346 can determine that UI components 710*a*, 710*b*, and 710*c* are not within the bounds of the visible portion of a screen, and that only UI components 710*d* and 710*e* are within the bounds of the visible portion of a screen. Mounting manager 356 can then, for each UI component that is within the bounds of the visible portion of a screen (i.e., UI components 710*d* and 710*e*), retrieve the bounds that were previously computed by the layout manager 344 (e.g., the bounds illustrated in FIG. 6). Mounting manager 346 can then create an actual view hierarchy to be rendered on the screen by combining the retrieved bounds with one or more artifacts (e.g., text strings, images, videos, etc.) for each UI component that is within the bounds of the visible portion of a screen (i.e., UI components 710*d* and 710*e*). For example, as illustrated in FIG. 8, mounting manager 346 can combine one or more artifacts 810 (810*a*, 810*b*, . . . 810*n*) with previously determined bounds of UI components in a container 815 to render/mount an actual view 820 on a screen. Artifacts can be managed and stored by an artifacts manager 350.

Figure 9:
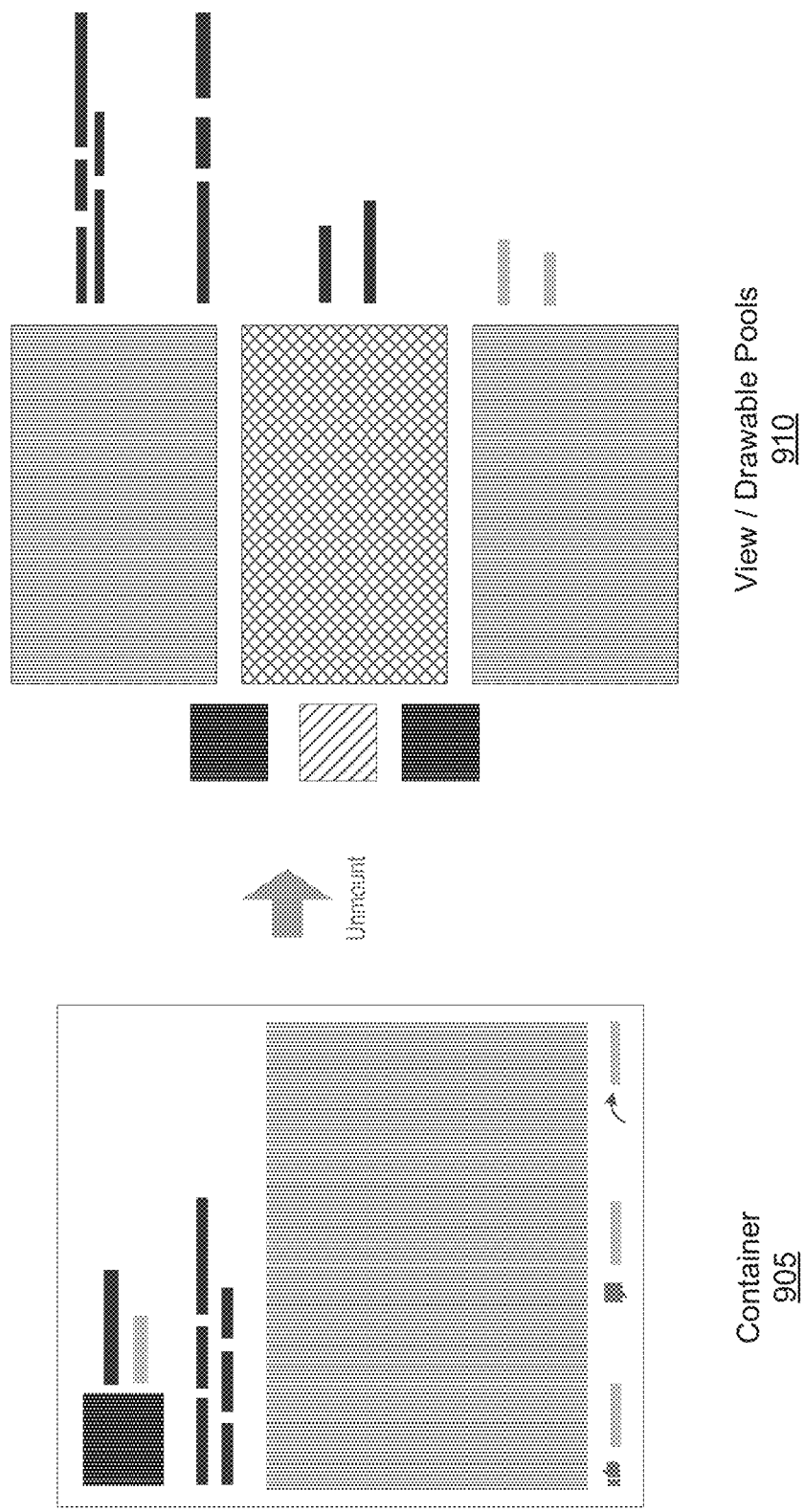
FIG. 9 is a display diagram illustrating incremental mount of components in accordance with some embodiments.

Recycler 348 manages the recycling of UI components. When UI components move off screen, recycler manager can make them immediately available for reuse by other containers. For example, when a portion of a container is no longer within the bounds of the visible portion of a screen, recycler 348 can determine a set of recyclable UI components that are within the portion of the container no longer visible. For each recyclable UI component, recycler 348 clears all references to artifacts of that recyclable specific UI component. For example, when UI components 710*a*, 710*b*, and 710*c* of container 710 (FIG. 7) are no longer within the bounds of the visible portion of the screen (as illustrated in FIG. 7), recycler 348 can disassociate the UI components 710*a*, 710*b*, and 710*c* with the artifacts used to render them (e.g., the actual image rendered in UI component 710*a* and the actual text rendered in UI components 710*b* and 710*c*). Recycler 348 can then select a pool of components and add the recycled UI components to the pool. For example, as illustrated in FIG. 9, when container 905 is no longer within the bounds of a visible portion of a screen, recycler 348 adds the UI components of container 905 to one or more view/drawable pools of components 910.

Figure 11:
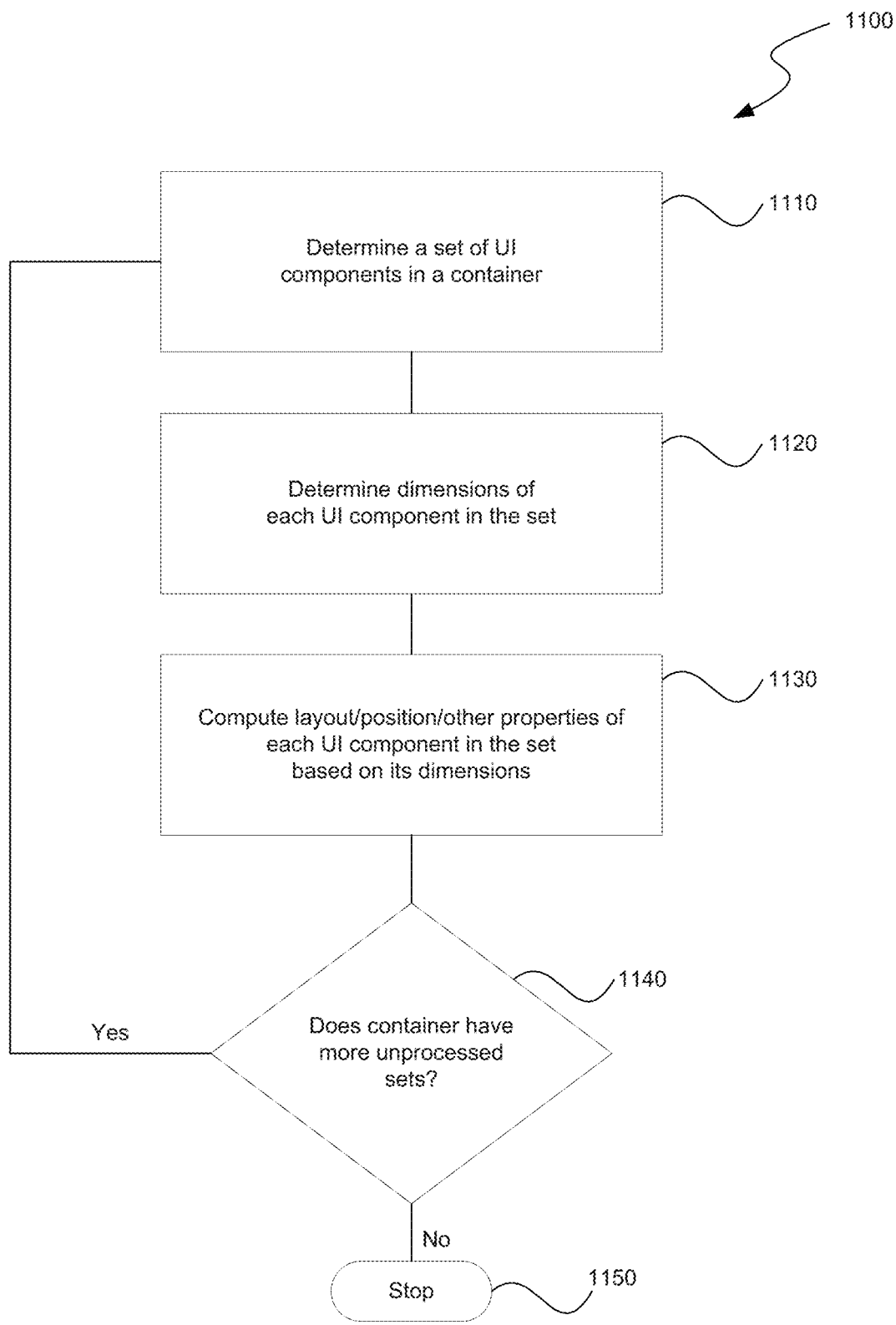
FIG. 11 is a flow diagram illustrating a process for a computer system to incrementally mount UI components in accordance with some embodiments.

FIG. 11 is a flow diagram illustrating a process 1100 for a computer system (e.g., the computing system 100 of FIG. 1) to incrementally mount UI components in accordance with some embodiments. In particular, the process illustrated in FIG. 11 can be performed as part of the layout step of the incremental mount framework. The process begins at block 1110 where process 1100 determines a set of UI components in a container. For example, for the containers illustrated in FIGS. 4 and 5, process 1100 can, at block 1110, determine one or more sets of UI components in each container 405-415 (FIGS. 4A-4C) and 510 (FIG. 5). The sets of UI components may be determined based on, for example, a direction of view (e.g., a set of UI components in an X direction, a set of UI components in a Y direction, etc.). Other criteria can be used to determine the one or more sets of UI components (e.g., special features/properties of UI components, such as core UI components, optional UI components, etc.).

Then, for each UI component in each set, process 1100 can determine its bounds. For instance, at block 1120, process 1100 can determine the dimensions (e.g., size, shape, length, width, height, etc.) of each UI component in the set. Process 1100 can, at block 1130, compute layout, position, and/or other properties of each UI component in the set. Layout and/or position of a UI component can be based on a set of coordinates (e.g., X, Y, and Z) that indicate a position of the UI component relative to a corner of the display screen, a corner of the app bounds, other components in the container, etc. Other properties of a UI component include, but are not limited to, font, color, resolution, user defined properties, border width, padding, margin, offset, etc. At block 1140, process 1100 can determine if the container has any other unprocessed sets of UI components (i.e., sets of UI components for which the bounds (e.g., dimensions, layout, position, properties, etc.) have not been computed). If any such sets exist (e.g., set of UI components in X direction was processed, but the set of UI components in Y direction was not processed), process 1100 return to block 1110 and repeats one or more steps illustrated in blocks 1110-1140 for any such unprocessed sets. If no unprocessed sets exist, then process 1100 terminates at block 1150. The result of process 1100 can be a set of UI components and their respective bounds (e.g., dimensions, layout, position, properties, etc.). Process 1100 can be performed for one or more containers, each with different UI components and associated properties.

Figure 12:
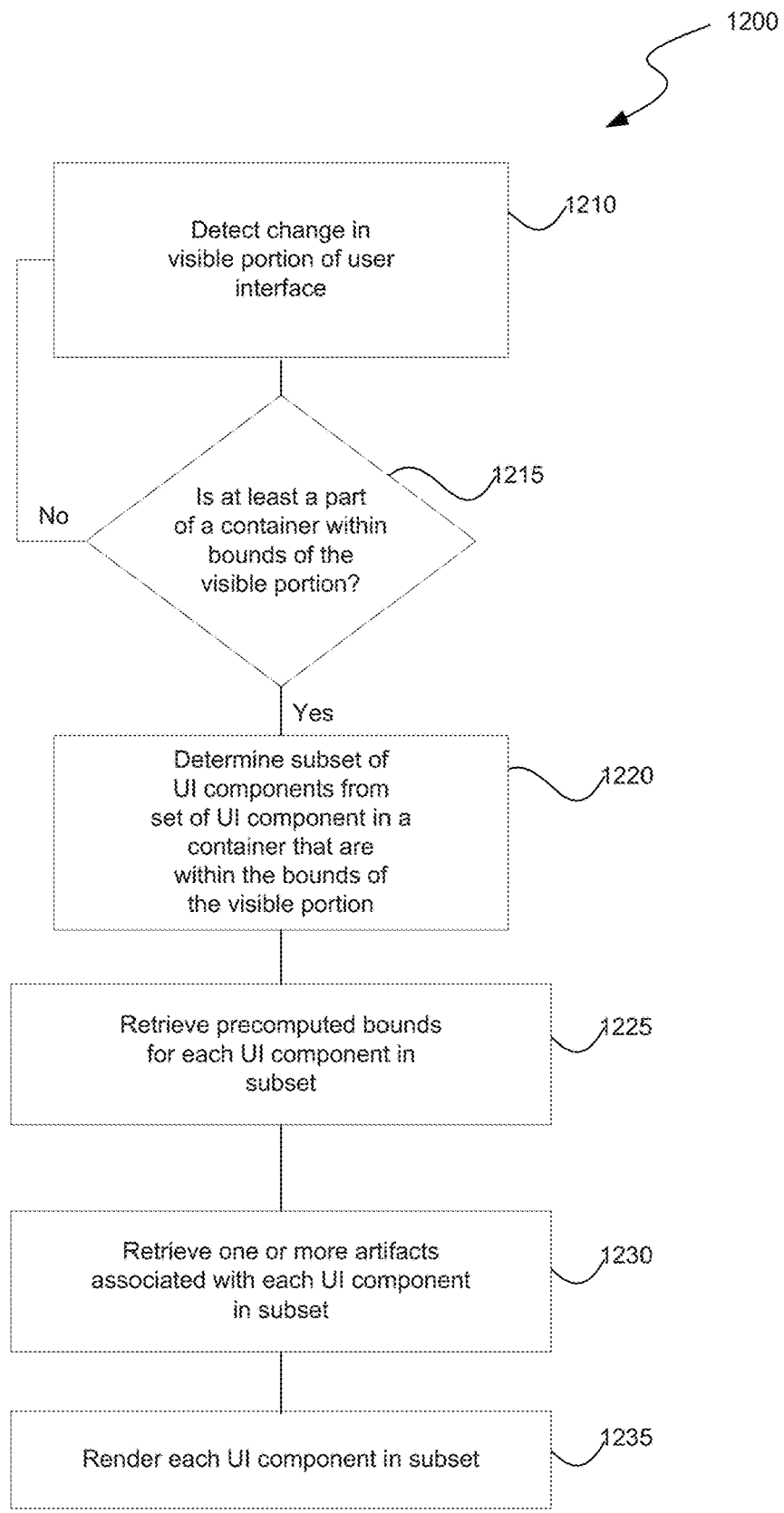
FIG. 12 is a flow diagram illustrating a process for a computer system to incrementally mount UI components in accordance with some embodiments.

FIG. 12 is a flow diagram illustrating a process 1200 for a computer system (e.g., the computing system 100 of FIG. 1) to incrementally mount UI components in accordance with some embodiments. In particular, the process illustrated in FIG. 12 can be performed as part of the rendering step of the incremental mount framework. The process begins at block 1210 when it detects a change in a visible portion of a user interface (e.g., window, screen, etc.). A change in a visible portion of a user interface can be detected, for example, when a user opens an application, scrolls through an application, switches screens within an application, etc. When a change is detected, at block 1215, process 1200 determines if at least a portion of a container is within the visible bounds of the user interface. This can be done, for example, by evaluating a visible property for a container. In some implementations, an event can be triggered when a container (or any of its constituent components) becomes visible on a user interface. If no portion of the container is within the visible bounds, process 1200 returns to block 1210 and continues to detect changes in the visible portion of the user interface.

However, if at least a portion of a container is within the visible bounds, at block 1220, process 1200 determines a subset of UI components in the container that fall within the visible bounds (e.g., a subset comprising UI components 710*d* and 710*e* in FIG. 7). For example, if a container has two set of UI components (set 1 for an X direction, and set 2 for a Y direction), process 1200 can determine two subsets of UI components (subset 1 from set 1 and subset 2 from set 2) wherein each UI component in each subset is visible on the user interface. Then, at block 1225, for each UI component in each subset, process 1200 retrieves its precomputed bounds (e.g., dimensions, layout, position, properties, etc.). At block 1230, process 1200 can also retrieve one or more artifacts (e.g., text strings, images, videos, etc.) for each UI component that is within the bounds of the visible portion of a screen. For example, at step 1230, process 1200 can retrieve artifacts 810*a*, 810*b*, . . . 810*n* (FIG. 8). Process 1200 can then, at block 1235, render each UI component in each subset using the precomputed bounds and the retrieved artifacts. For example, process 1200 can combine the one or more artifacts 810 (810*a*, 810*b*, . . . 810*n*) with previously determined bounds of UI components in a container 815 to render/mount an actual view 820 on a screen. The render position of a UI component can be based on the resolution of the user interface.

Figure 13:
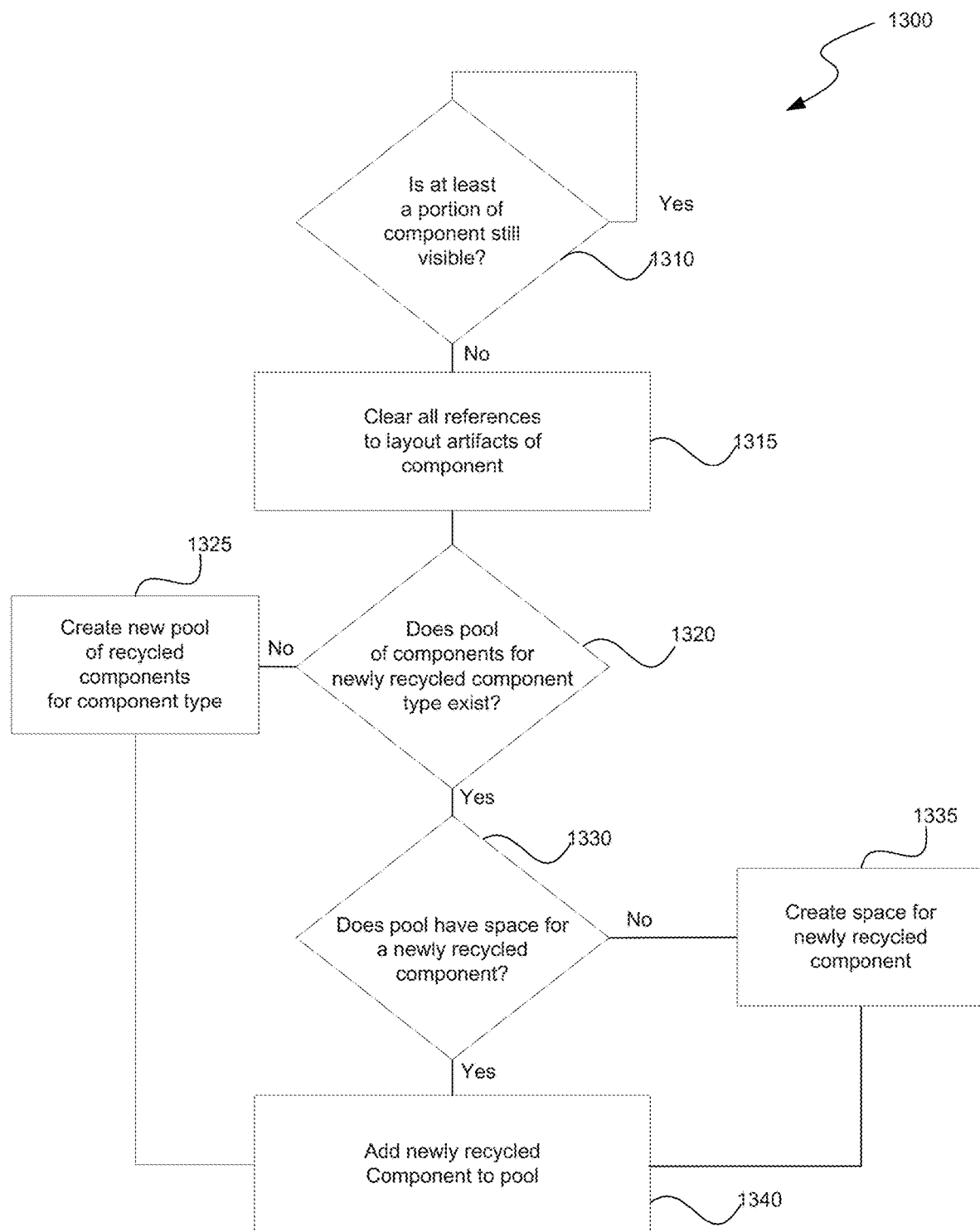
FIG. 13 is a flow diagram illustrating a process for a computer system to recycle incrementally mounted UI components in accordance with some embodiments.

FIG. 13 is a flow diagram illustrating a process 1300 for a computer system (e.g., the computing system 100 of FIG. 1) to incrementally mount UI components in accordance with some embodiments. In particular, the process illustrated in FIG. 13 can be performed as part of the recycling step of the incremental mount framework. The process begins at block 1310 where it determines if a portion of a UI component is still within the visible bounds of the screen. If at least a portion of the UI component is still visible, process 1300 stays at block 1310. However, if no portion of the UI component is within the visible bounds of the screen (e.g., when the user scrolls away completely from the UI component), process 1300 proceeds to block 1315. At block 1315, process 1300 clears all references to artifacts associated with the UI component being recycled. For example, when UI components 710*a*, 710*b*, and 710*c* of container 710 (FIG. 7) are no longer within the bounds of the visible portion of the screen (as illustrated in FIG. 7), process 1300, at block 1315 can disassociate the UI components 710*a*, 710*b*, and 710*c* with the artifacts used to render them (e.g., the actual image rendered in UI component 710*a* and the actual text rendered in UI components 710*b* and 710*c*).

At block 1320, process 1300 determines whether a pool of recycled UI components exists. For example, if this is the first UI component being recycled, a pool of recycled components may not exist (or may be empty). In some implementations, a separate pool for each type of UI component can be maintained. For example, a pool for text UI components, a pool for image UI components, etc. Process 1300 can determine availability of one or more pools based on the type of the component, size of various pools, timestamp when pool was created, etc. If a pool is not available, process 1300 proceeds to block 1325 where a new pool is created. The new pool can be a common pool, or may be designated to be a pool of one or more types of UI components. The newly recycled UI component can then be added to the newly created pool at block 1340.

On the other hand, if a pool is available, process 1300 determines, at block 1330, whether the identified pool (or set of pools) have sufficient space for adding the newly recycled UI component. When the identified pool (or set of pools) has sufficient space, the newly recycled UI component, is added to the pool at block 1340. However, when the identified pool (or set of pools) does not have sufficient space, process 1300 can, at block 1335, create space for the newly recycled UI component. For example, process 1300 can remove one or more previously recycled components in the pool based on one or more factors such as, timestamp when previously recycled component was added to the pool, popularity of the previously recycled component, complexity of the previously recycled component, etc. Once sufficient space is created, at block 1340, process 1300 adds the newly recycled UI component to the pool.

Figure 14:
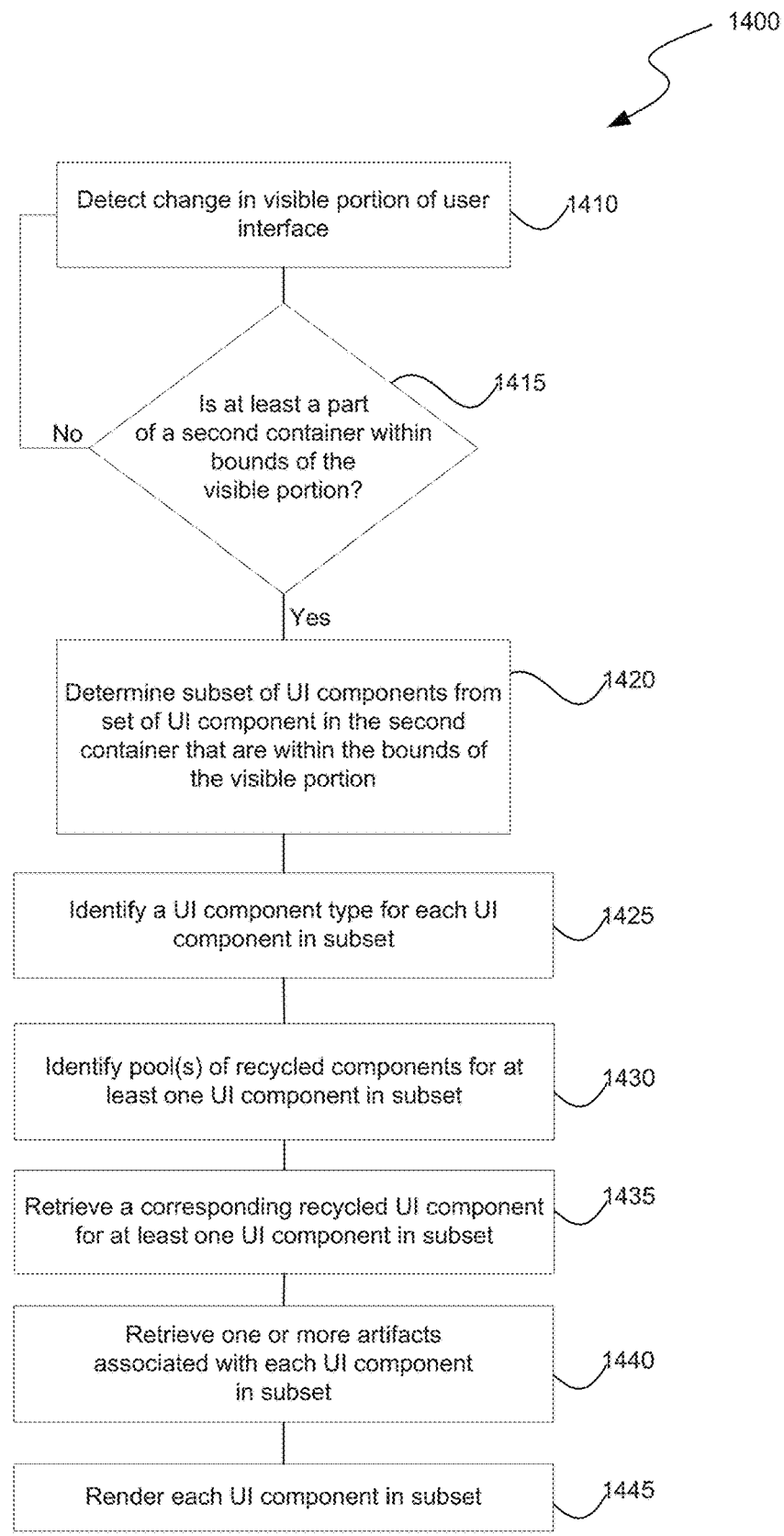
FIG. 14 is a flow diagram illustrating a process for a computer system to recycle incrementally mounted UI components in accordance with some embodiments.

FIG. 14 is a flow diagram illustrating a process 1400 for a computer system (e.g., the computing system 100 of FIG. 1) to recycle incrementally mounted UI components in accordance with some embodiments. In particular, FIG. 14 illustrates the reverse process wherein recycled UI components from a pool of components can be used to render UI components in a second container when at least a part of the second container falls within the bounds of visible portions of a screen. The process begins at block 1410 when it detects a change in a visible portion of a user interface (e.g., screen). When a change is detected, at block 1415, process 1400 determines if at least a portion of a second container is within the visible bounds of the user interface. This can be done, for example, by evaluating a visible property for the second container. In some implementations, an event can be triggered when the second container (or any of its constituent components) becomes visible on a user interface. If no portion of the second container is within the visible bounds, process 1400 returns to block 1410 and continues to detect changes in the visible portion of the user interface.

However, if at least a portion of a container is within the visible bounds, at block 1420, process 1400 determines a subset of UI components in the second container that fall within the visible bounds. Then, at block 1425, for each UI component in each subset, process 1400 identifies a type of the UI component (e.g., text, image, video, header, footer, etc.). At block 1430, process 1400 can identify one or more pools of recycled UI components for each UI component in each subset. In some implementation, the pool(s) is identified based on the type of the UI component. For example, if the UI component is of a type video, then process 1400 identifies a pool of recycled UI components of type video as a potential source of recycled UI components for the video UI component. In some implementation, different types of UI components may all be part of the same pool of recycled UI components.

Figure 10:
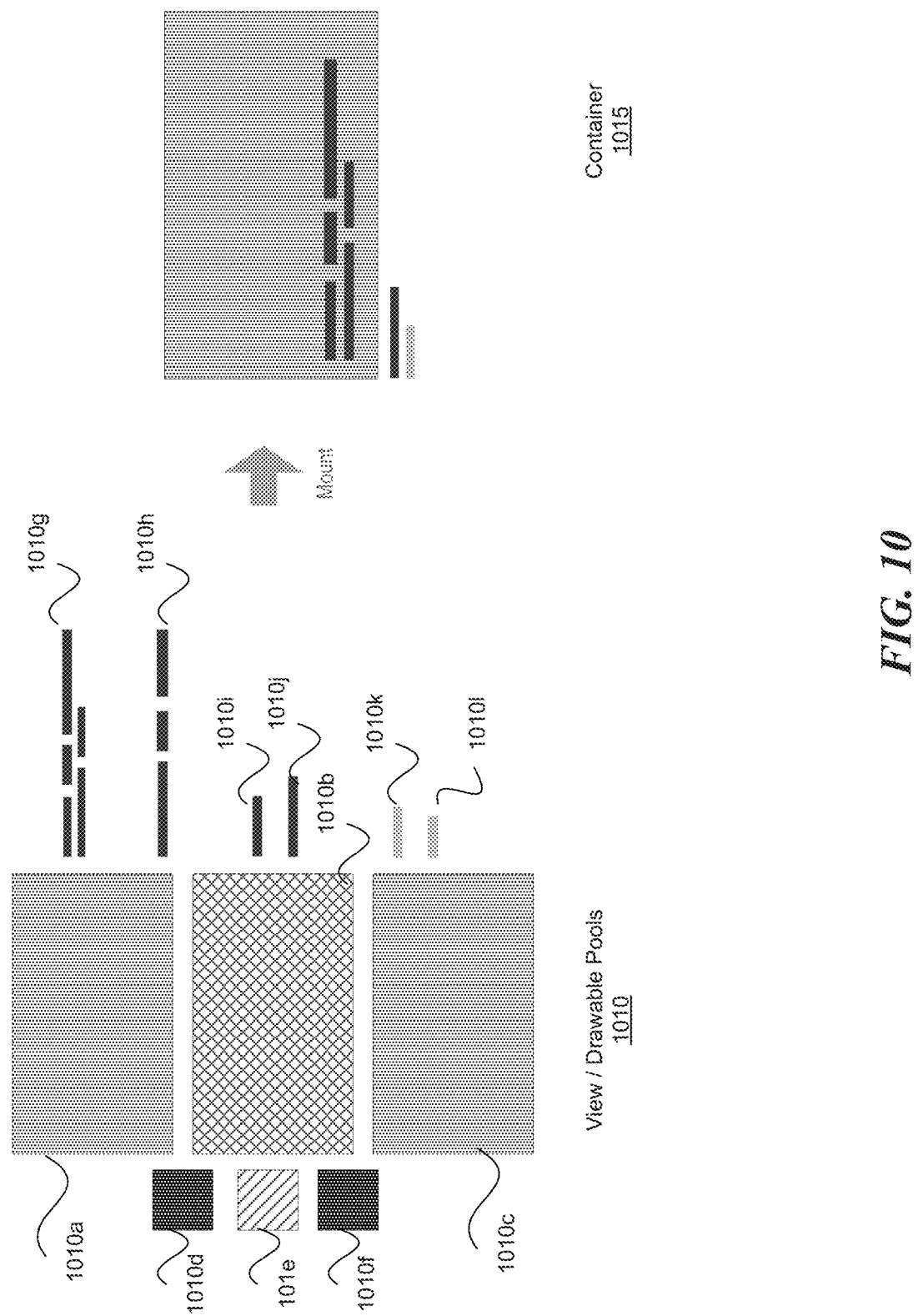
FIG. 10 is a display diagram illustrating incremental mount of components in accordance with some embodiments.

When a pool of recycled UI components is identified, process 1400 at block 1435 can retrieve corresponding recycled UI components for one or more UI components in the subset of UI components that are visible on the screen. For example, as illustrated in FIG. 10, process 1400 can select recycled UI components 1010*a*, 1010*g*, 1010*j*, and 1010*k* from a pool of recycled UI components 1010 for the UI components in container 1015. At block 1440, process 1400 can also retrieve one or more artifacts (e.g., text strings, images, videos, etc.) for each UI component that is within the bounds of the visible portion of a screen. Process 1400 can then, at block 1445, render each UI component in each subset using the recycled UI components and the retrieved artifacts.

Those skilled in the art will appreciate that the components illustrated in FIGS. 1-13 described above, may be altered in a variety of ways. For example, the order of the logic may be rearranged, substeps may be performed in parallel, illustrated logic may be omitted, other logic may be included, etc. In some implementations, one or more of the components described above can execute one or more of the described processes.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for incremental display of user interface (UI) components, comprising:

determining a set of UI components in a container;

for each UI component of at least one of the set of UI components, prior to the UI component entering a visible portion of a user interface, computing, by a background thread of a computing system, bounds of the UI component and storing the computed bounds, wherein the bounds are based on a determined dimension of the UI component in an X direction and a Y direction;

in response to a first change in the visible portion of the user interface:

determining that at least part of the container is within the bounds of the visible portion of the user interface, wherein the part of the container that is within the bounds of the visible portion of the user interface comprises one or more specific UI components of the at least one of the set of UI components; and for each specific UI component of the one or more specific UI components:

retrieving the previously computed bounds for the specific UI component;

identifying a UI component type for the specific UI component;
identifying, from a plurality of pools of recycled components, a pool of recycled components associated with the identified UI component type, wherein each pool within the plurality of recycled pools is designated for recycled components of a different type;
retrieving, from the pool of recycled components, one or more visual artifacts associated with the specific UI component; and
rendering the specific UI component using the previously computed bounds and the one or more associated visual artifacts;
in response to a second change in the visible portion of the user interface, which is subsequent to the first change:
determining that at least part of the container previously within the bounds of the visible portions of the user interface is no longer within the bounds of the visible portion of the user interface;
determining that a plurality of UI components from the part of the container no longer within the bounds of the visible portion of the user interface are recyclable, the plurality of recyclable UI components comprising a first recyclable component and a second recyclable UI component;
for each of the recyclable UI components:
clearing all references to visual artifacts of the recyclable UI component;
identifying a component type of the recyclable UI component; and
determining whether a pool of recycled components is available for recycled components of the identified component type;
in response to determining that no pool is available for recycled components associated with the identified component type of the first recyclable UI component, creating a new pool of recycled components for recycled components associated with the identified component type of the first recyclable UI component; and
in response to identifying an available pool of recycled components for recycled components associated with the identified component type of the second recyclable UI component, adding the second recyclable UI component to the identified pool of recycled components for the identified component type of the second recyclable UI component.

2. The method of claim 1, wherein at least one of the set of UI components comprises a horizontal scroll component, a vertical scroll component, or a combination thereof.

3. The method of claim 1, wherein the bounds of at least one of the set of UI components comprise a pair of coordinates indicative of a position of the UI component relative to a corner of the user interface.

4. The method of claim 1, wherein a render position of at least one of the set of UI components is based on an image resolution of the user interface.

5. The method of claim 1, wherein the container comprises a set of UI components in the X direction and a set of UI components in the Y direction.

6. The method of claim 1, wherein the plurality of pools of recycled components comprises at least one of a pool for text UI components or a pool for image UI components.

7. The method of claim 1, wherein prior to adding the second recyclable UI component to the identified pool of recycled components for the identified component type of the second recyclable UI component:

determining whether the identified pool of recycled components, for the identified component type of the second recyclable UI component, has space for the second recyclable UI component; and
when the identified pool of components does not have space for the second recyclable UI component, removing at least one recyclable UI component from the identified pool of components.

8. The method of claim 7, wherein the at least one recyclable UI component is removed from the identified pool of components based on at least one of a popularity metric or a complexity metric.

9. The method of claim 7, wherein the at least one recyclable UI component is removed from the identified pool of components based on a timestamp of when the at least one recyclable UI component was added to the identified pool of components.

10. A system for incremental display of user interface (UI) components on a user interface, the system comprising:
at least one processor; and
at least one memory, coupled to the at least one processor, and carrying instructions that, when executed by the at least one processor, cause the system to perform operations comprising:
determining a set of UI components in a container;
for each UI component of at least one of the set of UI components, prior to the UI component entering a visible portion of the user interface:
computing, by a background thread executed by the processor, bounds of the UI component, wherein the bounds are based on a determined dimension of the UI component in an X direction and a Y direction; and
storing the computed bounds of the UI component; and
in response to a first change in the visible portion of the user interface:
determining that at least part of the container is within the bounds of the visible portion of the user interface, wherein the part of the container that is within the bounds of the visible portion of the user interface comprises one or more specific UI components of the at least one of the set of UI components; and
for each specific UI component of the one or more specific UI components:
retrieving the previously stored bounds for the specific UI component;
identifying a UI component type for the UI component;
identifying, from a plurality of pools of recycled components, a pool of recycled components associated with the identified UI component type, wherein each pool within the plurality of recycled pools is designated for recycled components of a different type;
retrieving, from the pool of recycled components, one or more visual artifacts associated with the specific UI component; and
rendering the specific UI component using the previously stored bounds and the one or more associated visual artifacts;
in response to a second change in the visible portion of the user interface, which is subsequent to the first change:
determining that at least part of the container previously within the bounds of the visible portions of the user interface is no longer within the bounds of the visible portion of the user interface;
determining that a plurality of UI components from the part of the container no longer within the bounds of the visible portion of the user interface are recyclable, the plurality of recyclable UI components comprising a first recyclable component and a second recyclable UI component;

for each of the recyclable UI components:

clearing all references to visual artifacts of the recyclable UI component;

identifying a component type of the recyclable UI component; and determining whether a pool of recycled components is available for recycled components of the identified component type;

in response to determining that no pool is available for recycled components associated with the identified component type of the first recyclable UI component, creating a new pool of recycled components for recycled components associated with the identified component type of the first recyclable UI component; and in response to identifying an available pool of recycled components for recycled components associated with the identified component type of the second recyclable UI component, adding the second recyclable UI component to the identified pool of recycled components for the identified component type of the second recyclable UI component.

11. The system of claim 10, wherein at least one of the set of UI components comprises a horizontal scroll component, a vertical scroll component, or a combination thereof.

12. The system of claim 10, wherein the bounds of at least one of the set of UI components comprise a pair of coordinates indicative of a position of the UI component relative to a corner of the user interface.

13. The system of claim 12, wherein a render position of at least one of the set of UI components is based on an image resolution of the user interface.

14. The system of claim 10, wherein the container comprises a set of UI components in the X direction and a set of UI components in the Y direction.

15. The system of claim 10, wherein the plurality of pools of recycled components comprises at least one of a pool for text UI components or a pool for image UI components.

16. The system of claim 10, wherein a render position of at least one of the set of UI components is based on an image resolution of the user interface.

17. A non-transitory computer-readable storage medium storing instructions that, when executed by a computing system, cause the computing system to perform operations for incremental display of user interface (UI) components on a user interface, the operations comprising:

for each UI component of at least one of a set of UI components in a container, prior to the UI component entering a visible portion of the user interface, computing, by a background thread of a computing system, bounds of the UI component and storing the computed bounds, wherein the bounds are based on a determined dimension of the UI component in an X direction and a Y direction;

in response to detecting a first change in the visible portion of the user interface:

determining that at least part of the container is within the bounds of the visible portion of the user interface, wherein the part of the container that is within the bounds of the visible portion of the user interface comprises one or more specific UI components of the at least one of the set of UI components; and for each specific UI component of the one or more specific UI components: retrieving the previously computed bounds for the specific UI component;

identifying a UI component type for the specific UI component;

identifying, from a plurality of pools of recycled components, a pool of recycled components associated with the identified UI component type, wherein each pool within the plurality of recycled pools is designated for recycled components of a different type;

retrieving, from the pool of recycled components, one or more visual artifacts associated with the specific UI component; and rendering the specific UI component using the previously computed bounds and the one or more associated artifacts;

in response to detecting a second change in the visible portion of the user interface, which is subsequent to the first change:

determining that at least part of the container previously within the bounds of the visible portions of the user interface is no longer within the bounds of the visible portion of the user interface;

determining that a plurality of UI components from the part of the container no longer within the bounds of the visible portion of the user interface are recyclable, the plurality of recyclable UI components comprising a first recyclable component and a second recyclable UI component;

for each of the recyclable UI components:

clearing all references to visual artifacts of the recyclable UI component;

identifying a component type of the recyclable UI component; and determining whether a pool of recycled components is available for recycled components of the identified component type;

in response to determining that no pool is available for recycled components associated with the identified component type of the first recyclable UI component, creating a new pool of recycled components for recycled components associated with the identified component type of the first recyclable UI component; and in response to identifying an available pool of recycled components for recycled components associated with the identified component type of the second recyclable UI component, adding the second recyclable UI component to the identified pool of recycled components for the identified component type of the second recyclable UI component.

18. The non-transitory computer-readable storage medium of claim 17, wherein determining that one or more specific UI components of the at least one of the set of UI components in the container is within the bounds of the visible portion of the user interface is based on evaluating a visible property of each specific UI component of the one or more specific UI components.

19. The non-transitory computer-readable storage medium of claim 17, wherein the container comprises a set of UI components in an X direction and a set of UI components in a Y direction.

20. The non-transitory computer-readable storage medium of claim 17, wherein at least one of the set of UI components comprises a horizontal scroll component, a vertical scroll component, or a combination thereof.

* * * * *